United States Patent Office 3,259,617
Patented July 5, 1966

3,259,617
PROCESS FOR PURIFICATION OF PEPTIDES
John T. Sheehan, Middlesex, N.J., assignor, by mesne assignments, to E. R. Squibb & Sons, Inc., New York, N.Y., a corporation of Delaware
No Drawing. Filed May 24, 1963, Ser. No. 282,873
5 Claims. (Cl. 260—112.5)

The present invention relates to an improvement in the process of preparing useful peptides by the reaction of a free amino acid or a peptide with an ester of a protected amino acid or peptide with a phenol substituted by one or more electronegative substituents, such as p-nitrophenol, whereby dipeptide or polypeptide is formed.

This process yields in addition to the desired peptide product, the phenol as a major impurity in the reaction medium. To obtain a suitable useful peptide product, the removal of the phenol is necessary. Formerly, this was done by saturating the reaction mixture with sodium bicarbonate and repeatedly extracting the mixture (often as many as twelve times) with a solvent such as ethyl acetate. Such a procedure, particularly in the commercial manufacture of peptides where large quantities of reagents are involved, is tedious, uneconomical and frequently impractical.

The present invention is based on the discovery that the phenol by-products obtained in peptide formations form complexes with a polymer of vinylpyridine and that such complexes are insoluble in water and all organic solvents commonly used in chemical syntheses. Hence, the complex can be easily removed by decantation, filtration or centrifugation from the reaction medium, leaving the pure peptide in the solution. The peptide may then be easily recovered in the usual manner, as by adjusting the pH to an acidic pH, whereupon the peptide separates from solution in crystalline form.

The insoluble complex of the phenol and polymer of vinylpyridine serves not only to remove the undesired phenol by-product of the peptide syntheses but also serves to clarify the solution and provide a purer product with greater tendency to crystallize—a highly desired characteristic especially as the peptide chain length increases. Moreover, where cost is a factor, the substituted phenol can be easily regenerated from this complex in a very pure state for reuse.

The process of this invention, therefore, essentially comprises treating the reaction mixture of an electronegatively substituted phenol ester of a protected amino acid or a protected peptide and a free amino acid or peptide with a polymer of vinylpyridine at a substantially neutral pH and removing the phenol-polyvinylpyridine complex which forms. By "a substantially neutral pH" is meant a pH in the range of about 4.5 to about 7.2, and optimally about 6.0 to about 6.5.

The reaction of the phenol ester and free amino acid or peptide can be carried out in a solvent system, such as water, a polar organic solvent, such as dimethylformamide and tetrahydrofuran, a non-polar organic solvent, such as chloroform and ethylacetate, or a mixture of these. The polymer of vinylpyridine may be added to the reaction mixture either before or after the desired reaction, or the reaction mixture, after the desired reaction has taken place, may be passed through a column of the polymer whereby the phenol is adsorbed on the polymer and removed from the reaction mixture.

Although any phenol substituted by one or more electronegative substituents may be used in forming the ester reactants, and hence esters with such substituted phenols as m-nitrophenol, o-nitrophenol, p-cyanophenol, p-fluorophenol, 2,4-dinitrophenol, 3,5-dinitrophenol and 2,4-dichlorophenol are operable, the preferred phenol used in preparing the esters is p-nitrophenol.

By a "protected amino acid" is meant one of the amino acids: alanine, arginine, aspartic acid, citrulline, cysteine, diiodotyrosine, glutamic acid, glycine, histidine, hydroxyproline, isoleucine, leucine, lysine, methionine, phenylalanine, proline, serine, threonine, tryptophane, tyrosine and valine, wherein the α-amino group has been converted to a protected form, such as by reacting with benzyl chloroformate to yield the N-benzyloxycarbonyl derivative, with phthalic anhydride to yield the N-phthalyl derivative, or with trifluoroacetic acid anhydride to yield the N-trifluoroacetyl derivative. By a "protected peptide" is meant a pepide prepared by combining two or more of the amino acids mentioned above and protecting the free terminal α-amino group as described above.

Among the vinylpyridines that can be used in forming the vinylpyridine polymer may be mentioned 2-vinylpyridine, 4-vinylpyridine, 2-methyl-5-vinylpyridine and, preferably, 4-vinylpyridine. Although any vinylpyridine polymer that is an insoluble solid may be used, the preferred polymers are those having a molecular weight of at least about one million and optimally a molecular weight of about one million to about two million. In the examples following, the polymer used is a vinylpyridine resin having a molecular weight of about one to two million that is marketed by the Ionac Chemical Company of Birmingham, New Jersey, under the name Polyvinylpyridine polymers and copolymers.

If it is desired to recover the phenol from the polymer, this may be done by treating the complex with either an acid, such as a mineral acid (e.g., hydrochloric acid and sulfuric acid) or a base, such as an alkali hydroxide (e.g., sodium hydroxide), whereby the phenol is removed from the polymer and can be readily restored to its original state for repeated use.

The following examples illustrate the process of this invention (all temperatures being in centigrade):

Example 1.—Benzyloxycarbonyl-L-phenylalanyl-nitro-L-arginine, methyl ester 10 g. of polyvinylpyridine resin are suspended in a solution containing 1.5 g. of nitro-L-arginine methyl ester hydrochloride and 2.0 g. of benzyloxycarbonyl-L-phenylalanine p-nitrophenyl ester in 10 ml. of dimethylformamide. The mixture is stirred for 48 hours at room temperature and then filtered to remove the resin. The resin is washed with two 10 ml. portions of dimethylformamide. The combined filtrate and washings are diluted with 75 ml. of water and stirred until the oil which separates solidifies. The solid is filtered and washed with ether and crystallized from 10 ml. of boiling methanol. The product weighs about 0.5 g. and melts at about 156°; $[\alpha]_D^{24°}$ −11.4 (c., 1 methanol).

Analysis.—Calcd. for $C_{24}H_{32}N_6O_7$, C, 55.80; H, 6.24; N, 16.27. Found: C, 55.88; H, 6.14; N, 16.10.

Example 2.—Benzyloxyglycyl-L-proline

A solution of 1.5 g. of L-proline in 32 ml. of water is adjusted to pH 10.5 by the addition of 2.6 ml. of 5 N sodium hydroxide solution and to this is added 5 g. of polyvinylpyridine resin. While stirring at room temperature, 3.3 g. of benzyloxycarbonylglycine p-nitrophenyl ester is slowly added as it dissolves. The mixture is stirred overnight during which time the pH falls to 9. The mixture is adjusted with acid to pH 6, stirred for 15 minutes and the resin removed by filtration and washed three times with 5 ml. portions of water. The combined filtrate and washings are acidified to pH 2 with 6 N hydrochloric acid and an oil separates which quickly sets to a solid. This is removed by filtration and crystallized from ethyl acetate to yield about 2.0 g. of product, M.P. about 156–157° (60% yield).

*Example 3.—Benzyloxycarbonylglycyl-L-proline*

A solution of 1.5 g. of L-proline dissolved in 32 ml. of water is adjusted to pH 10.5 by the addition of 2.6 ml. of 5 N sodium hydroxide solution. To this solution, cooled in an ice bath, is added with stirring a solution of 3.3 g. of benzyloxycarbonylglycine p-nitrophenyl ester in 32 ml. of tetrahydrofuran. The temperature of the mixture is allowed to rise to room temperature and the mixture allowed to stand one day. After evaporation of the tetrahydrofuran, the aqueous solution is adjusted to pH 6 with dilute hydrochloric acid and the resulting solution passed through a column of 5 g. of polyvinylpyridine resin. The resin is then rinsed with three 5 ml. portions of water. The combined filtrate and washings are brought to pH 2 with 6 N hydrochloric acid. An oil separates which quickly solidifies. The material is filtered off and washed with water and after air drying it is crystallized from boiling ethyl acetate to give 2.2 g. of product, M.P. 156–157° (75% yield).

The following example illustrates the absorption of the phenols by the polyvinylpyridine resin and their subsequent recovery therefrom by treatment with a base or acid:

*Example 4*

A solution of 1 g. of p-nitrophenol in 30 ml. of a 50% ethanol solution is passed through a column containing 3 g. of polyvinylpyridine resin previously washed with 50% ethanol solution. The filtrate on evaporation leaves no residue indicating all of the p-nitrophenol has been absorbed on the column. The column is washed with 100 ml. of water and then eluted with 50 ml. of 0.5 N sodium hydroxide solution and then washed with 50 ml. of water. The combined eluate and washings from the column are acidified and extracted with chloroform. The extract on evaporation yields about 0.8 g. of p-nitrophenol.

This invention may be variously otherwise embodied within the scope of the appended claims.

What is claimed is:

1. In the process for preparing peptides by reacting a compound selected from the group consisting of an ester of a protected amino acid and a protected peptide with a phenol substituted by an electro-negative substituent, with a compound selected from the group consisting of a free amino acid and a free peptide and removing the phenol by-product formed, the improvement wherein the phenol by-product formed is removed by complexing said phenol with a solid polymer of vinylpyridine.

2. The process of claim 1 wherein the complexing is done at a substantially neutral pH.

3. The process of claim 2 wherein the phenol is p-nitrophenol.

4. A process for preparing peptides which comprises reacting a compound selected from the group consisting of the p-nitrophenyl ester of a protected amino acid and the p-nitrophenyl ester of a protected peptide with a compound selected from the group consisting of a free amino acid and a free peptide and treating the resulting reaction mixture with a solid polyvinylpyridine resin at a substantially neutral pH, whereby the p-nitrophenol is complexed with the polymer of vinylpyridine and recovering the complex from the mixture.

5. A process for preparing peptides which comprises reacting a compound selected from the group consisting of the p-nitrophenyl ester of a protected amino acid and the p-nitrophenyl ester of a protected peptide with a compound selected from the group consisting of a free amino acid and a free peptide in the presence of a solid polyvinylpyridine resin, adjusting the pH to a substantially neutral pH, whereby the p-nitrophenol is complexed with the polymer of vinylpyridine and removing the complex from the mixture.

References Cited by the Examiner

UNITED STATES PATENTS

| | | | |
|---|---|---|---|
| 2,540,984 | 2/1951 | Jackson | 210—37 X |
| 2,683,124 | 7/1954 | D'Alelio | 210—37 X |
| 2,861,948 | 11/1958 | McKellar | 210—37 X |
| 2,911,363 | 11/1959 | Kissling | 260—2.1 |

LEWIS GOTTS, *Primary Examiner.*

WILLIAM H. SHORT, *Examiner.*

PERRY A. STITH, *Assistant Examiner.*